United States Patent [19]

Pieslak et al.

[11] 4,455,204

[45] Jun. 19, 1984

[54] PROTECTING METAL SUBSTRATES FROM CORROSION

[75] Inventors: George Pieslak, Menlo Park; Elena C. Fritchle, Palo Alto, both of Calif.

[73] Assignee: Raychem Corporation, Menlo Park, Calif.

[21] Appl. No.: 380,593

[22] Filed: May 21, 1982

Related U.S. Application Data

[63] Continuation of Ser. No. 282,354, Jul. 13, 1981.

[51] Int. Cl.³ .................. C23F 13/00; F16L 9/14; B32B 27/00
[52] U.S. Cl. .................... 204/147; 138/143; 138/145; 138/146; 138/DIG. 6; 174/DIG. 8; 428/36; 428/349; 428/355; 428/523
[58] Field of Search ......... 138/143, 145, 146, DIG. 6; 204/147, 148, 196, 197, 290 R, 291; 174/DIG. 8; 428/36, 349, 355, 523

[56] References Cited

U.S. PATENT DOCUMENTS

| | | | |
|---|---|---|---|
| 2,027,962 | 1/1936 | Currie | 264/230 |
| 3,006,242 | 4/1963 | Cook et al. | 264/230 |
| 3,110,696 | 11/1963 | Dexter | 544/211 |
| 3,354,063 | 11/1967 | Shutt | 204/196 |
| 3,440,210 | 4/1969 | Blount, Jr. et al. | 260/42.22 |
| 3,455,336 | 7/1969 | Ellis | 174/DIG. 11 |
| 3,660,438 | 5/1972 | Dexter | 525/2 |
| 3,718,495 | 2/1973 | Tomita | 428/355 |
| 3,773,723 | 11/1973 | Dillenschneider | |
| 3,993,737 | 1/1976 | Glander et al. | |
| 4,077,948 | 3/1978 | Cowell et al. | |
| 4,091,134 | 5/1978 | Uemura et al. | 138/145 |
| 4,133,352 | 1/1979 | Koons | 138/145 |
| 4,287,034 | 9/1981 | Pieslak et al. | 204/147 |

OTHER PUBLICATIONS

Eastman Industrial Chemicals, Publication D-137 entitled "Eastman Inhibitor® OABH Oxalyl bis(benzylidenehydrazide)".

Ciba Geigy Polymer Additives Department Product Data Sheet on "CHEL® 180 Metal Deactivator for Polymers and Coatings".

Ciba Geigy Polymer Additives Department preliminary technical bulletin on Irganox MD-1024 Metal Deactivator/Antioxidant.

*Primary Examiner*—William R. Dixon, Jr.
*Attorney, Agent, or Firm*—Herbert G. Burkard; Edith A. Rice

[57] ABSTRACT

An adhesive composition comprises an adhesive component and a hydrazine derivative. The adhesive composition has improved resistance to cathodic disbonding when used to adhere a protective coating, such as a polymeric layer, to the surface of a metal substrate. Cathodic disbonding is observed when an electric current is impressed through the substrate to reduce corrosion by inhibiting loss of metal ions from the substrate.

35 Claims, No Drawings

PROTECTING METAL SUBSTRATES FROM CORROSION

This is a continuation of application Ser. No. 282,354, filed July 13, 1981.

BACKGROUND OF THE INVENTION

1. Field of the Invention

This invention relates to adhesive compositions having improved adhesive properties, in particular improved resistance to cathodic disbonding and to the use of such adhesives in bonding protective coatings to substrates.

To protect steel, or other metal, pipes and pipelines from corrosion, a protective coating is generally applied. The protective coating can be, for example, a polymeric sheet, tape or sleeve of, for example polyethylene, bonded to the surface of the pipe. Various adhesives and mastics can be used to bond the coating to the pipe. However, accidental damage to the protective coating can occur during installation and use of the pipe or pipeline exposing some of the surface of the pipe to the environment.

Corrosion of a steel or iron pipe when exposed to the environment is due to electrochemical reactions in which the pipe loses iron ions to water in the environment coating localized anodic regions on the pipe. To prevent the development of these anodic regions and thus the attendent corrosion of the pipe, an electric current can be impressed along the length of the pipe. The pipe is connected to a negative electrical potential, thus causing the pipe to act as a cathode. Further loss of iron ions to the environment is inhibited.

It is known that adhesive compositions generally used to bond a protective coating to a pipe are adversely affected by this imposed electrical current. The result of this is a weakening of the adhesive bond between the coating and the pipe such that the coating comes away from the pipe. More of the surface of the pipe is then exposed to the corrosive conditions of the environment. This phenomenon is referred to in the art as "cathodic disbonding".

In commonly assigned U.S. patent application Ser. No. 92,852, filed Nov. 9, 1979 a polyhydroxy compound is added to an adhesive composition to improve its resistance to cathodic disbondment. It has now been discovered that the addition of a hydrazine derivative to an adhesive composition improves the resistance to cathodic disbonding.

SUMMARY OF THE INVENTION

One aspect of this invention comprises an article of a heat-shrinkable material having coated on at least a part of the surface thereof an adhesive composition comprising an adhesive component and, in an amount sufficient to impart improved resistance to cathodic disbondment to the adhesive composition, a hydrazine derivative of the formula

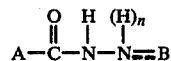

wherein n is 0 or 1;

A is a radical selected from the group consisting of alkyl, aryl, aralkyl, hydrazido, radicals of the formula

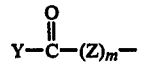

wherein m is 0–20, Y is alkyl, aryl or heterocyclic and Z is alkyl, aryl or heterocyclic, and substituted derivatives thereof wherein the substitutents are lower alkyl, halogen or hydroxyl;

when n is 1, B is selected from the group consisting of alkyl, aryl, aralkyl, radicals of the formula

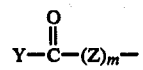

where Y, Z and m are as defined above, and substituted derivatives thereof, wherein the substituents are lower alkyl, halogen or hydroxyl; and when n is 0, B is a divalent radical of the formula $=CH-(CH_2)_q-W$ wherein q is 0–20 and W is alkyl, aryl or heterocyclic, and substituted derivatives thereof, wherein the substituents are lower alkyl, halogen or hydroxyl.

Another aspect of this invention comprises a pipe having bonded to the surface thereof a polymeric coating, said coating being bonded to said pipe with an adhesive composition comprising an adhesive component and from about 0.01 to about 30% by weight, based on the total weight of the adhesive composition of a hydrazine derivative of the formula

wherein n is 0 or 1;

A is a radical selected from the group consisting of alkyl, aryl, aralkyl, hydrazido, radicals of the formula

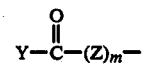

wherein m is 0–20, Y is alkyl, aryl or heterocyclic and Z is alkyl, aryl or heterocyclic, and substituted derivatives thereof wherein the substitutents are lower alkyl, halogen or hydroxyl;

when n is 1, B is selected from the group consisting of alkyl, aryl, aralkyl, radicals of the formula

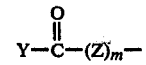

where Y, Z and m are as defined above, and substituted derivatives thereof, wherein the substituents are lower alkyl, halogen or hydroxyl; and when n is 0, B is a divalent radical of the formula $=CH-(CH_2)_q-W$ wherein q is 0–20 and W is alkyl, aryl or heterocyclic, and substituted derivatives thereof, wherein the substituents are lower alkyl, halogen or hydroxyl.

A further aspect of this invention comprises a metal pipe which is connected to an electric circuit such that the pipe forms a cathode; said pipe having bonded to the surface thereof a polymeric coating, said coating being bonded to said pipe with an adhesive composition comprising an adhesive component and from about 0.01 to about 30% by weight, based on the total weight of the adhesive composition of a hydrazine derivative of the formula

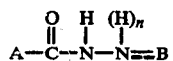

wherein n is 0 or 1;

A is a radical selected from the group consisting of alkyl, aryl, aralkyl, hydrazido, radicals of the formula

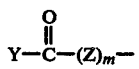

wherein m is 0–20, Y is alkyl, aryl or heterocyclic and Z is alkyl, aryl or heterocyclic, and substituted derivatives thereof wherein the substitutents are lower alkyl, halogen or hydroxyl;

when n is 1, B is selected from the group consisting of alkyl, aryl, aralkyl, radicals of the formula

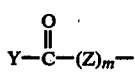

where Y, Z and m are as defined above, and substituted derivatives thereof, wherein the substituents are lower alkyl, halogen or hydroxyl; and when n is 0, B is a divalent radical of the formula =CH—(CH$_2$)$_q$—W wherein q is 0–20 and W is alkyl, aryl or heterocyclic, and substituted derivatives thereof, wherein the substituents are lower alkyl, halogen or hydroxyl.

Yet another aspect of this invention comprises a method of protecting a metal substrate from corrosion which comprises bonding a protective coating to said pipe with an adhesive composition comprising an adhesive component and in an amount sufficient to import improved resistance to cathodic disbondment to the adhesive composition, a hydrazine derivative of the formula

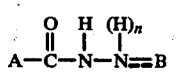

wherein n is 0 or 1;

A is a radical selected from the group consisting of alkyl, aryl, aralkyl, hydrazido, radicals of the formula

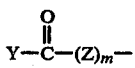

wherein m is 0–20, Y is alkyl, aryl or heterocyclic and Z is alkyl, aryl or heterocyclic, and substituted derivatives thereof wherein the substitutents are lower alkyl, halogen or hydroxyl;

when n is 1, B is selected from the group consisting of alkyl, aryl, aralkyl, radicals of the formula

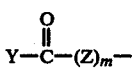

where Y, Z and m are as defined above, and substituted derivatives thereof, wherein the substituents are lower alkyl, halogen or hydroxyl; and when n is 0, B is a divalent radical of the formula =CH—(CH$_2$)$_q$—W wherein q is 0–20 and W is alkyl, aryl or heterocyclic, and substituted derivatives thereof, wherein the substituents are lower alkyl, halogen or hydroxyl;

applying a negative electrical potential to said substrate, thereby impressing an electric current through said substrate.

DETAILED DESCRIPTION OF THE INVENTION

The heat-recoverable article of this invention can be, for example, a sheet, tape or sleeve coated on at least a portion of one surface thereof with an adhesive composition, as defined more fully below.

When in the form of a sheet or tape, the article is generally coated with the adhesive composition over one entire surface thereof. The sheet or tape is placed on the substrate to be protected with the adhesive coated surface placed in contact with the substrate. The sheet or tape is preferably heat-shrinkable and is wrapped around the pipe and heat is applied to cause the sheet or tape to shrink into intimate contact with the pipe. The adhesive is preferably a hot melt adhesive and the application of heat activates the adhesive and produced a bond between the article to the substrate. The substrate can be any metal substrate sought to be protected from corrosion but in general the heat-recoverable article of this invention is used to protect iron or steel pipe.

When the heat-recoverable article is heat-shrinkable and in the form of a sleeve, it is coated with adhesive on the interior surface thereof. The sleeve can be a continuous tubular member or a sheet adapted to form a tube when wrapped around a substrate. The sleeve is positioned around the pipe and heated to shrink the sleeve onto the pipe and melt or activate the adhesive to bond the sleeve to the pipe. Heat-recoverable sleeves of this type are well known in the art. For example, polymeric tubes are described in U.S. Pat. Nos. 2,027,962 to Currie, and 3,086,242 to Cook et al. and wraparound sleeves are described in U.S. Pat. No. 3,455,336 to Ellis. The disclosures of these U.S. patents are incorporated herein by reference. Coating of the sleeve or sheet with the adhesive composition can be accomplished by well known coating techniques.

The protective coating or covering applied to the metal substrate can be a heat-recoverable article as above or a sheet, tape or tube of non-heat-recoverable material. The protective coating is preferably a polyolefin such as polyethylene or polypropylene. Other polymers such as polyvinyl chloride and polymeric blends can also be used. Particularly preferred is cross-linked polyethylene.

In some embodiments of the invention the adhesive composition is applied to the metal substrate prior to applying the protective coating.

To further protect a metal substrate from corrosion, an electrical current can be impressed through the substrate. The metal substrate is connected to a negative electrical potential causing the substrate to become a cathode in the electrical system. Such a system for corrosion inhibition generally includes a sacraficial anode. The cathode characteristics of the substrate inhibit loss of metal ions from the substrate and thus reduce corrosion.

The adhesive composition used to adhere the protective coating to the substrate comprises an adhesive component and a hydrazine derivative. The adhesive component can be any adhesive typically used to bond corrosion protection coatings to metal pipes or other substrates, and particularly those generally used to bond a coating to a pipeline which will carry an impressed current to protect the pipeline from corrosion. Such adhesives include hot melt adhesives such as those based on thermoplastic polyamides, polyolefins, polyesters, polyurethanes, polysulfides and the like. Particularly preferred are hot melt adhesives containing ethylene homo- and copolymers, for example copolymers of ethylene with vinyl acetate, maleic anhydride, acrylic acid, methacrylic acid or an alkyl acrylate such as ethyl acrylate and blends thereof. Mastics can also be used, for example low molecular weight polyisobutylene based mastic compositions.

The adhesive composition can contain the other additives such as tackifiers, fillers, waxes, rubbers, stabilizers and the like. Tackifiers that are used include phenol-formaldehyde resins, hydrocarbon resins, vinyl toluene-alpha-methyl styrene copolymers, polyterpenes, phenol-terpene resins, dibasic acid modified esters, polymerized rosin esters, modified rosin esters, aromatic hydrocarbon resins and coumarone and coumarone-indene resins. Other tackifiers that can be included are well known. Fillers that can be used include pigments and reinforcing agents such as carbon black.

Waxes which are usually added to hot melt adhesives are crystalline waxes, such as lower molecular weight polyethylene, oxidized polyethylene waxes, ethylenevinyl acetate copolymer wax, ethylene-acrylic acid copolymer wax, ethylene-maleic anhydride copolymer wax, atactic polypropylene, and the like. High temperature properties may be improved by incorporation of high, low or medium density polyethylene, linear low density polyethylene or high temperature waxes. Rubbers which can be used are natural and synthetic rubbers, particularly ethylenepropylene rubbers, ethylene-propylene-diene rubbers, butyl rubbers and thermoplastic elastomers such as those based on styrene-butadiene-styrene or styrene-isoprene-styrene linear or radical block copolymers. Stabilizers which can be used include antioxidants, such as phenolic antioxidants, hindered amine antioxidants, and the like.

Polyhydroxy compounds are described in copending application Ser. No. 92,852, Supra, can also be included in the adhesive composition.

Suitable hydrazine derivatives include, for example, alkylhydroxyphenylalkanoyl hydrazines such as those described in U.S. Pat. No. 3,660,438 to Dexter, the disclosure of which is incorporated herein by reference. The compounds disclosed by Dexter have the formula

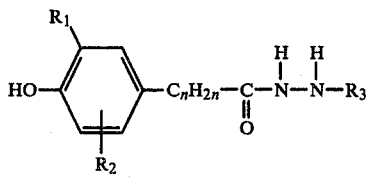

wherein $R_1$ is a lower alkyl group containing from 1 to 6 carbon atoms, $R_2$ is hydrogen or a lower alkyl group containing from 1 to 6 carbon atoms, $R_3$ is hydrogen, an alkanoyl group containing 2 to 18 carbon atoms or a group represented by the formula

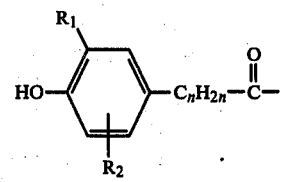

and n is an integer from 0 to 5. Typical hydrazine derivatives of this type are β-(3,5-di-t-butyl-4-hydroxyphenyl)-propionyl-hydrazide, N,N'-bis-β-3,5-di-t-butyl-4-hydroxyphenyl)-propionyl-hydrazine, N-stearyl-N'-[β-(3,5-di-t-butyl-4-hydroxyphenyl)-propionyl]-hydrazine, and the like. Particularly preferred is N,N'-bis(3,5-di-t-butyl-4-hydroxy-hydrocinnamoyl)hydrazine.

Also suitable are the oxalyl hydrazides described in U.S. Pat. No. 3,440,210 to Blount et al, the disclosure of which is incorporated by reference. The compounds are of the formula

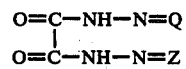

where Q and Z are selected from $H_2$ and benzyl radicals of the formula

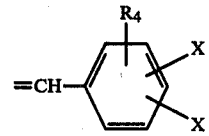

wherein $R_4$ is a monovalent radical selected from the group consisting of hydrogen, alkyl, and alkoxy and X is hydrogen or halogen, with at most one of Q and Z being $H_2$. Typical oxalyl hydrazides of this type are N,N'-dibenzal(oxalyl dihydrazide) and N-benzal-(oxalyl dihydrazide). In the practice of this invention, N,N'-dibenzal-(oxalyl dihydrazide) is the preferred oxalyl hydrazide.

Other appropriate hydrazine derivatives are those described in U.S. Pat. No. 3,110,696 also to Dexter, the disclosure of which is incorporated herein by reference. These compounds have the formula

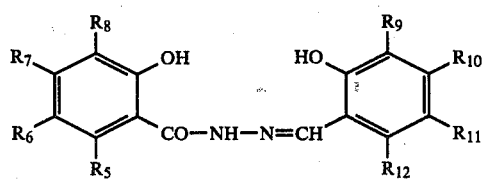

wherein $R_5$, $R_6$, $R_7$, $R_8$, $R_9$, $R_{10}$, $R_{11}$ and $R_{12}$ are each independently hydrogen, alkyl, especially lower alkyl, alkoxy, especially lower alkoxy, or a phenyl group. The preferred compound of this type is N-salicylidene-N'-salicylhydrazide.

Other hydrazine derivatives of the type herein described are known to those skilled in the art. The hydrazine derivatives can be prepared by known methods, such as those described in the above-mentioned patents. Several of the hydrazides are commercially available.

The hydrazine derivative improves the adhesion properties, particularly the resistance to cathodic disbonding, of various adhesives and mastics used with metals in corrosion protection applications. The amount of the hydrazine derivative added to improve the resistance to cathodic disbonding characteristics of the adhesive ranges from about 0.01% to about 30%, preferably from about 0.1% to about 10% and especially from about 0.1% to about 5%, by weight based on the total weight of the adhesive composition.

The hydrazine derivative can be blended with the adhesive component to form a homogeneous adhesive composition by conventional methods. Such methods include use of a two roll mill, a Banbury mixer or a Brabender mixer. Temperatures during the mixing or blending procedure should be from about 150° to about 400° F., preferably from about 250° to about 350° F.

The following examples illustrate the invention. In these examples, adhesive compositions were prepared containing an adhesive component and a hydrazine derivative. The adhesive compositions were tested for resistance to cathodic disbondment by using the adhesive composition to be tested to bond a heat-shrinkable sleeve of polyethylene to a steel pipe. The polyethylene coated pipe was then tested by the method of ASTM G-42-75 to determine the resistance of the adhesive to cathodic disbondment.

EXAMPLES 1-10

Adhesive compositions were prepared by thoroughly mixing the ingredients in a two-mill roll at a mixing temperature of 325°-350° F.

An adhesive component was prepared by blending 25 parts by weight of an ethylene-ethyl acrylate copolymer containing 18% ethyl acrylate, 23 parts by weight of high density polyethylene, 20 parts by weight of medium density polyethylene wax, 5 parts by weight of high density poly ethylene wax, 8-13 parts by weight of styrenebutadienestyrene block copolymer rubber, 10 parts by weight of a hydrocarbon tackifier, 3 parts by weight of carbon black and 1 part by weight of polymerized 1,2-dihydro-2,2,4-trimethyl quinoline as an antioxidant. To the adhesive component was added a hydrazine derivative as designated in the following Table in the amount specified for each example. The amount of styrene-butadiene-styrene block copolymer in the composition was varied depending on the amount of hydrazine derivative used so that the total amount of ingredients was 100 parts by weight for each composition.

The adhesive compositions were tested for their resistance to cathodic disbondment by following test procedure. The results are shown in the Table.

CATHODIC DISBONDING TEST PROCEDURE

The cathodic disbonding resistance of an adhesive can be tested by the test method found in ASTM G-42-75, method A.

The adhesive composition to be tested was pressed into slabs, 6"×6"×0.025", in a hot press between two "Teflon", polytetrafluoroethylene, coated plates.

The surface of a steel pipe, 12 inches long and 2 inches in diameter was grit blasted and degreased with solvent and preheated to 400°-425° F. with a torch. The sample adhesive slab, trimmed to 6"×4"×0.025", was placed on the preheated pipe and a heat-shrinkable sleeve of cross-linked polyethylene was placed over it and heated to shrink the sleeve over the adhesive and pipe. One end of the pipe was then sealed with a heat-shrinkable cap.

A hole (holiday) was drilled through the polyethylene coating and adhesive in the middle of the length of pipe to expose the metal surface of the pipe at that point. The pipe was then immersed in an electrolyte solution comprising water and one weight percent of each of sodium chloride, sodium sulfate, and sodium carbonate. A potential of −1.5 volts was applied to the pipe thus making the pipe a cathode in the electrolyte solution which also contains a sacrificial anode. The sample and electrolyte solution were maintained at a temperature of 95° C. for five days. The pipe was then removed and the area around the holiday inspected to determine the extent of disbondment. The approximate radius of the disbondment area surrounding the holiday was measured in millimeters (mm) and recorded.

TABLE

| Example | Amount (Parts by Weight) | Hydrazine Derivative | Cathodic Disbonding Radius |
|---|---|---|---|
| 1 | 0 | None | Complete disbonding |
| 2 | 1 | N—Salicylidene-N'—salicylhydrazide | 8 mm |
| 3 | 2 | N—Salicylidene-N'—salicylhydrazide | 14 mm |
| 4 | 5 | N—Salicylidene-N'—salicylhydrazide | 15 mm |
| 5 | 1 | N,N'—bis(3,5-di-t-butyl-4-hydroxycinnamoyl) hydrazine | 11 mm |
| 6 | 2 | N,N'—bis(3,5-di-t-butyl-4-hydroxycinnamoyl) hydrazine | 9.5 mm* |
| 8 | 1 | Oxalyl bis(benzylidenehydrazide) | 4 mm |
| 9 | 2 | Oxalyl bis(benzylidenehydrazide) | 6 mm* |
| 10 | 5 | Oxalyl bis(benzylidenehydrazide) | 7 mm* |

*This represents the average disbonding radius for several replications.

The heat-recoverable articles and adhesive compositions of this invention can be used for other purposes besides protection of metal substrates. The presence of the hydrazine derivative in the adhesive compositions improves the adhesion properties with various substrates, including metals other than steel and iron, and polymeric substrates such as articles of polyethylene, polypropylene, polyvinyl chloride and the like. In the pipe protection context it has been found that a patch of polymeric sheet material coated with the adhesive composition can be used to repair localized damage to a protective coating on the pipe. The resulting bond between the patch and the covering is stronger than the bond formed between such materials if an adhesive composition without the hydrazine derivative is used.

The present invention has been described with reference to certain preferred embodiments thereof, other embodiments and variations are possible. Therefore the spirit and scope of the appended claims should not necessarily be limited to description of the preferred embodiments contained herein.

We claim:
1. An article of a heat-recoverable material having coated on at least a part of the surface thereof an adhesive composition comprising an adhesive component and, in an amount sufficient to impart improved resistance to cathodic disbondment to the adhesive composition, a hydrazine derivative of the formula

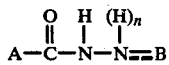

wherein n is 0 or 1;
  A is a radical selected from the group consisting of alkyl, aryl, aralkyl, hydrazido, radicals of the formula

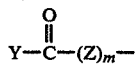

wherein m is 0–20, Y is alkyl, aryl or heterocyclic and Z is alkyl, aryl or heterocyclic, and substituted derivatives thereof wherein the substitutents are lower alkyl, halogen or hydroxyl;
  when n is 1, B is selected from the group consisting of alkyl, aryl, aralkyl, radicals of the formula

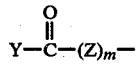

where Y, Z and m are as defined above, and substituted derivatives thereof, wherein the substituents are lower alkyl, halogen or hydroxyl; and
  when n is 0, B is a divalent radical of the formula =CH—(CH$_2$)$_q$—W wherein q is 0–20 and W is alkyl, aryl or heterocyclic, and substituted derivatives thereof, wherein the substituents are lower alkyl, halogen or hydroxyl.

2. An article in accordance with claim 1, wherein said article is a sheet.
3. An article in accordance with claim 1, wherein said article is a tape.
4. An article in accordance with claim 1, wherein said article is a sleeve.
5. An article in accordance with claim 1, wherein said heat-shrinkable material is a polymeric material.
6. An article in accordance with claim 5, wherein said polymeric material is polyethylene.
7. An article in accordance with claim 5, wherein said polymeric material is cross-linked polyethylene.
8. An article in accordance with claim 1, wherein said adhesive component is a hot melt adhesive.
9. An article in accordance with claim 1, wherein said hydrazine derivative is N,N'-bis(3,5-di-t-butyl-4-hydroxycinnamoyl) hydrazine.
10. An article in accordance with claim 1, wherein said hydrazine derivative is N-salicylidene-N'-salicylhydrazide.
11. An article in accordance with claim 1, wherein said hydrazine derivative is oxalyl bis(benzylidene hydrazide).
12. A pipe having bonded to the surface thereof a polymeric coating, said coating being bonded to said pipe with an adhesive composition comprising an adhesive component and from about 0.01 to about 30% by weight, based on the total weight of the adhesive composition of a hydrazine derivative of the formula

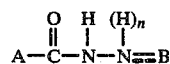

wherein n is 0 or 1;
  A is a radical selected from the group consisting of alkyl, aryl, aralkyl, hydrazido, radicals of the formula

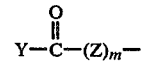

wherein m is 0–20, Y is alkyl, aryl or heterocyclic and Z is alkyl, aryl or heterocyclic, and substituted derivatives thereof wherein the substitutents are lower alkyl, halogen or hydroxyl;
  when n is 1, B is selected from the group consisting of alkyl, aryl, aralkyl, radicals of the formula

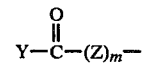

where Y, Z and m are as defined above, and substituted derivatives thereof, wherein the substituents are lower alkyl, halogen or hydroxyl; and
  when n is 0, B is a divalent radical of the formula =CH—(CH$_2$)$_q$—W wherein q is 0–20 and W is alkyl, aryl or heterocyclic, and substituted derivatives thereof, wherein the substituents are lower alkyl, halogen or hydroxyl.

13. A pipe in accordance with claim 12, wherein said pipe is of steel.
14. A pipe in accordance with claim 12, wherein said polymeric coating is polyethylene.
15. A pipe in accordance with claim 12, wherein said polymeric coating is cross-linked polyethylene.
16. A pipe in accordance with claim 12, wherein said adhesive component is a hot melt adhesive.
17. A pipe in accordance with claim 12, wherein said hydrazine derivative is N,N'-bis(3,5-di-t-butyl-4-hydroxycinnamoyl) hydrazine.
18. A pipe in accordance with claim 12, wherein said hydrazine derivative is N-salicylidene-N'-salicylhydrazide.
19. A pipe in accordance with claim 12, wherein said hydrazine derivative is oxalyl bis(benzylidene hydrazide).
20. A metal pipe which is connected to an electric circuit such that the pipe forms a cathode; said pipe having bonded to the surface thereof a polymeric coating, said coating being bonded to said pipe with an adhesive composition comprising an adhesive component and from about 0.01 to about 30% by weight, based on the total weight of the adhesive composition of a hydrazine derivative of the formula

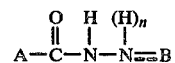

wherein n is 0 or 1;
  A is a radical selected from the group consisting of alkyl, aryl, aralkyl, hydrazido, radicals of the formula

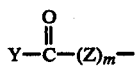

wherein m is 0–20, Y is alkyl, aryl or heterocyclic and Z is alkyl, aryl or heterocyclic, and substituted derivatives thereof wherein the substitutents are lower alkyl, halogen or hydroxyl;

when n is 1, B is selected from the group consisting of alkyl, aryl, aralkyl, radicals of the formula

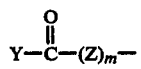

where Y, Z and m are as defined above, and substituted derivatives thereof, wherein the substituents are lower alkyl, halogen or hydroxyl; and when n is 0, B is a divalent radical of the formula =CH—(CH$_2$)$_q$—W wherein q is 0–20 and W is alkyl, aryl or heterocyclic, and substituted derivatives thereof, wherein the substituents are lower alkyl, halogen or hydroxyl.

21. A pipe in accordance with claim 20, wherein said pipe is of steel.

22. A pipe in accordance with claim 20, wherein said polymeric coating is polyethylene.

23. A pipe in accordance with claim 20, wherein said polymeric coating is cross-linked polyethylene.

24. A pipe in accordance with claim 20, wherein said adhesive component is a hot melt adhesive.

25. A pipe in accordance with claim 20, wherein said hydrazine derivative is N,N'-bis(3,5-di-t-butyl-4-hydroxycinnamoyl) hydrazine.

26. A pipe in accordance with claim 20, wherein said hydrazine derivative is N-salicylidene-N'-salicylhydrazide.

27. A pipe in accordance with claim 20, wherein said hydrazine derivative is oxalyl bis(benzylidene hydrazide).

28. A method of protecting a metal substrate from corrosion which comprises bonding a protective coating to said pipe with an adhesive composition comprising an adhesive component and, in an amount sufficient to impart improved resistance to cathodic disbondment to the adhesive composition, hydrazine derivative of the formula

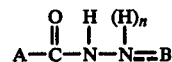

wherein n is 0 or 1;

A is a radical selected from the group consisting of alkyl, aryl, aralkyl, hydrazido, radicals of the formula

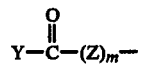

wherein m is 0–20, Y is alkyl, aryl or heterocyclic and Z is alkyl, aryl or heterocyclic, and substituted derivatives thereof wherein the substitutents are lower alkyl, halogen or hydroxyl;

when n is 1, B is selected from the group consisting of alkyl, aryl, aralkyl, radicals of the formula

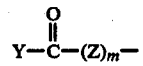

where Y, Z and m are as defined above, and substituted derivatives thereof, wherein the substituents are lower alkyl, halogen or hydroxyl; and when n is 0, B is a divalent radical of the formula =CH—(CH$_2$)$_q$—W wherein q is 0–20 and W is alkyl, aryl or heterocyclic, and substituted derivatives thereof, wherein the substituents are lower alkyl, halogen or hydroxyl;

applying a negative electrical potential to said substrate, thereby impressing an electric current through said substrate.

29. A method in accordance with claim 28, wherein said substrate is of steel.

30. A method in accordance with claim 28, wherein said polymeric coating is polyethylene.

31. A method in accordance with claim 28, wherein said polymeric coating is cross-linked polyethylene.

32. A method in accordance with claim 28, wherein said adhesive component is a hot melt adhesive.

33. A method in accordance with claim 28, wherein said hydrazine derivative is N,N'-bis(3,5-di-t-butyl-4-hydroxycinnamoyl) hydrazine.

34. A method in accordance with claim 28, wherein said hydrazine derivative is N-salicylidene-N'-salicylhydrazide.

35. A method in accordance with claim 28, wherein said hydrazine derivative is oxalyl bis(benzylidene hydrazide).

* * * * *